Aug. 11, 1942.        H. R. HELGESON        2,292,996
METHOD OF CARVING DUPLICATE DESIGNS
Filed July 5, 1941        3 Sheets-Sheet 1

Inventor
HAROLD R. HELGESON

By *(signature)*

Attorney

Aug. 11, 1942.   H. R. HELGESON   2,292,996
METHOD OF CARVING DUPLICATE DESIGNS
Filed July 5, 1941   3 Sheets-Sheet 2
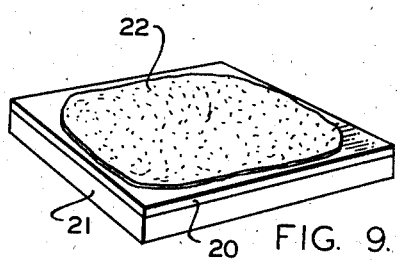
FIG. 9.
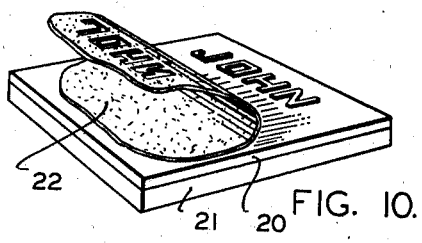
FIG. 10.
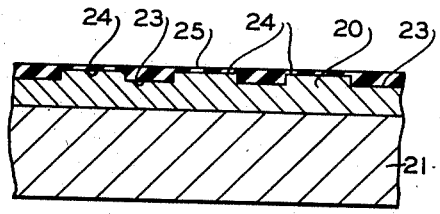
FIG. 11.
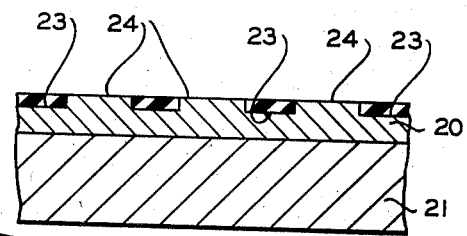
FIG. 12.
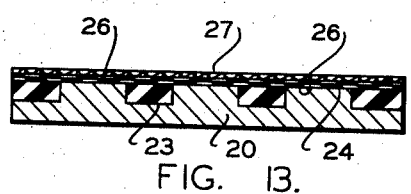
FIG. 13.
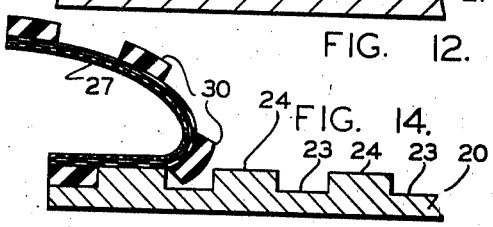
FIG. 14.
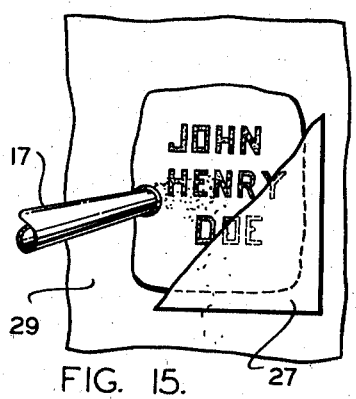
FIG. 15.
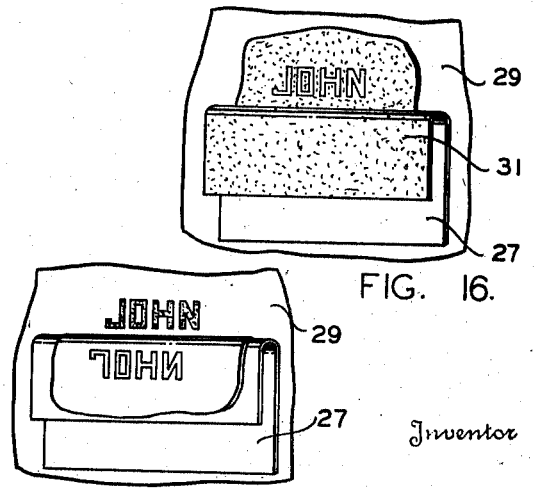
FIG. 16.
FIG. 17.
Inventor
HAROLD R. HELGESON
By Howard Fischer
Attorney Aug. 11, 1942.  H. R. HELGESON  2,292,996
METHOD OF CARVING DUPLICATE DESIGNS
Filed July 5, 1941  3 Sheets-Sheet 3

Inventor
HAROLD R. HELGESON

Attorney

Patented Aug. 11, 1942

2,292,996

UNITED STATES PATENT OFFICE 2,292,996

METHOD OF CARVING DUPLICATE DESIGNS

Harold R. Helgeson, St. Paul, Minn.

Application July 5, 1941, Serial No. 401,193

7 Claims. (Cl. 41—39)

My invention relates to a method of stenciling, wherein it is desired to provide a simple process by means of which a stencil having disconnected portions may be used a number of times.

Stencils used in sandblasting processes are ordinarily formed of rubber or glue or some resilient material, and are formed by cutting through this rubber or glue to uncover certain parts of the surface to be sandblasted. This stencil covers the work being sandblasted and the portions uncovered by the stencil are struck by the blast of sand and this sand engraves into the body a likeness of the uncovered portion, the portion of the surface covered by the stencil standing out in relief. If it is desired to repeat the design, it has been necessary to prepare a new stencil each time the work is sandblasted.

It is the object of the present invention to provide a stencil which may be constructed in such a way that disconnected parts of the stencil will be held in desired relationship during the application thereof to a surface to be sandblasted and in which the disconnected elements of the stencil are temporarily connected while moving the stencil from one surface which has been sandblasted to another surface which is to be sandblasted. Thus by my method a single stencil may be used a great number of times without danger of one part of the stencil being improperly positioned in the design. This method obviates the necessity of cutting a new design for each surface sandblasted and also obviates the necessity of assembling the various parts of the stencil upon the surface to be sandblasted.

It is a feature of my invention that I may cut any stencil whatsoever with the parts thereof connected or disconnected, and by the use of my method I may transfer all of the parts in unison onto the surface to be sandblasted or from one such surface to another. This I accomplish by providing a fracturable film upon the surface of the stencil which is destroyed by the force of the sandblast but which may hold the various parts of the stencil in desired relationship during the applying process.

It is a feature of my invention that by the use of my process I may adhere a new surface of paper, linen or other suitable material to the exposed surface of the stencil in the exact position which the disassociated parts of the stencil assume during the sandblasting operation, using this film as a vehicle for moving all of the parts to another surface. Thus the same stencil may be used time after time without the various parts thereof getting out of alignment or out of proper relationship one with respect to another, and the sandblasting operation may be repeated in an extremely short space of time.

It is a feature of my invention to provide a method of sandblasting which in preferred form utilizes the relative strength of two adhesive surfaces for its operation. The stencil is adhered to the surface to be sandblasted with an adhesive of relatively lower strength than the adhesive used for adhering the paper, linen or other film to the exposed surface of the stencil. Thus when the sandblasting operation has been completed, the film used for the transferring process is adhered to the outer or exposed surface of the film with an adhesive stronger than the adhesive holding the stencil to the sandblasted surface so that the stencil will remain on the flexible film rather than upon the cut surface and will be removed from the cut surface by the film.

It is an added feature of my invention to provide a method of preparing a stencil for sandblast which may utilize a zinc etching or other engraving in the preparation of the stencil. In this process a mold, such as a zinc etching, electrotype, or the like, may be filled with rubber paste solution or the like, which is partially set, and rolled smooth. This rubber or the like is then removed on its exposed surface until only that portion of the rubber which is receded below the surface of the etching or mold remains. By adhering a sheet of paper, linen or the like, to the rubber receded in the mold or etching, all of the parts of rubber originally recessed into the mold are adhered to the film or sheet which may then be secured to a surface to be sandblasted. Obviously, the reverse of the raised portions of the mold or casting form the stencil, and when the sandblasting takes place the same surface is exposed as would be formed if the mold or etching were printed upon the surface.

It is a feature of my invention that through the use of a zinc etching, electrotype or the like, a mold may be made which may be cast into a casing of plaster before the removal of the rear surface thereof in order to prevent injury to the etching or electrotype. The rear surface of the rubber casting may be rubbed away through the use of rubber solvent or the like, until merely those portions of the casting which originally extended down below the surface of the mold or etching remain. These portions of the casting may then be connected by a film adhered thereto so that all of the parts of rubber will be supported upon the film in proper relationship and so that these parts may be easily assembled upon a surface to be sandblasted.

A further feature of my invention resides in the fact that my invention may be accomplished by covering a mold with a plastic mass such as rubber, embedding a screen or the like into the rubber flush with the surface of the design thereon, removing the plastic mass and the screen from the mold, and stripping the rubber from the surface of the screen on the side thereof opposite the stencil design. This leaves a stencil having a reinforcing screen adhered to one surface thereof, which screen may be placed either in contact with, or spaced from, the work surface while sandblasting. This method obviates the necessity of rubbing excess rubber from the mold surface in the manner previously described.

It is a further feature of my invention that a screen adhered to one surface of the mold may be replaced when worn through, providing a rigid stencil which may be renewed. Where adhering of the stencil to the work surface is impractical, difficult, or costly, the stencil may be secured to material such as screen during the carving process. This screen may become injured during the process, but supports the elements of the stencil properly throughout. If the screen is damaged, it is replaced by applying a cloth or paper sheet to the exposed stencil surface, removing the stencil from the screen, and applying the stencil to a second screen, just as it is moved from one work surface to another.

It is a feature of my invention that through the use of this casting process, sandblast patterns may be formed at a low cost and in a short period of time which would require countless hours to reproduce if it were necessary to cut these patterns from a sheet of rubber or glue. A large drawing of the pattern may be made and this drawing may be reduced photographically and made into a zinc etching, which in turn may be used as the mold for forming the stencil. Thus by my method I provide a simple method of forming intricate stencils having disconnected parts which would be virtually impossible to construct through the use of the usual methods of procedure.

These and other objects and novel features of my invention will be more clearly and fully set forth in the following specification and claims.

In the drawings forming a part of my specification:

Figure 3:
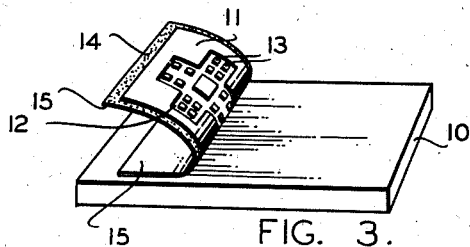

Figure 3 diagrammatically illustrates the design being removed from the surface upon which it was formed, showing the various parts of the design adhered to the backing sheet.

Figure 4:
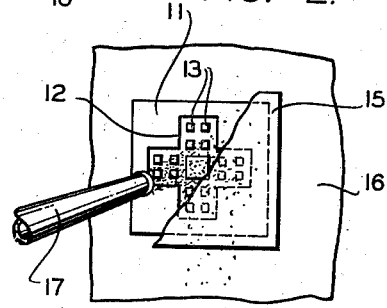

Figure 4 illustrates the actual sandblasting operation with the design shown in position upon the surface to be sandblasted.

Figure 5:
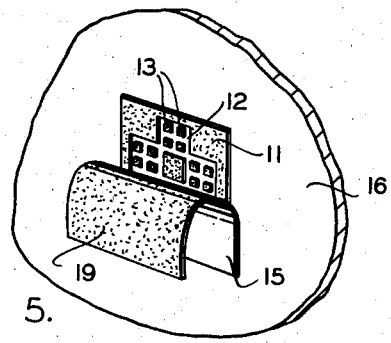

Figure 5 illustrates the application of a new film or backing sheet applied to the surface of the stencil.

Figure 6:
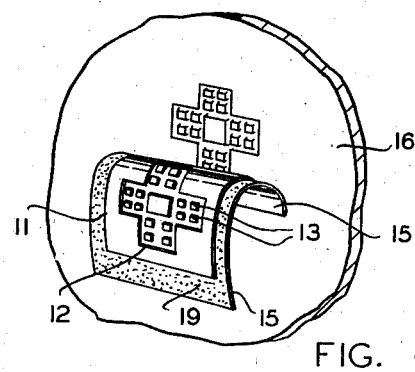

Figure 6 illustrates the various parts of the stencil being removed from the sandblasted surface, together with the film or backing sheet.

Figure 7:
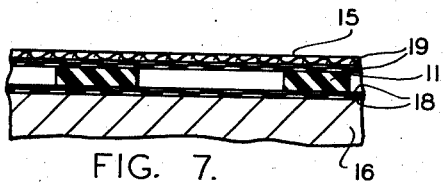

Figure 7 illustrates in section the formation of the stencil before the sandblasting operation.

Figure 8:
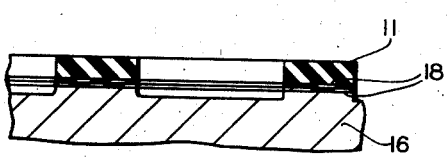

Figure 8 illustrates in section the appearance of the stencil after the start of the sandblasting operation after the backing film has been entirely destroyed.

Figure 9 is a perspective view of a rubber paste solution applied to the surface of a zinc etching or electrotype.

Figure 10 illustrates the removal of the rubber from the etching or electrotype after the same has set.

Figure 11 illustrates in section the rubber applied either to the etching or electrotype or upon a cast base.

Figure 12 is a cross-sectional view of the stencil after the rubber has been removed down to the surface of the etching or mold block.

Figure 13 is a cross-sectional view through the mold block shown in Figures 11 and 12, showing a film applied to the surface of the stencil.

Figure 14 is a view similar to Figure 13, showing the removal of the stencil from the mold block or etching.

Figure 15 illustrates the sandblasting operation in which the backing sheet or flexible film is destroyed.

Figure 16 illustrates the application of a new film sheet to the surface of the stencil.

Figure 17 illustrates the removal of the stencil from the sandblasted surface assembled in readiness for use upon a new surface to be sandblasted.

Figure 18:
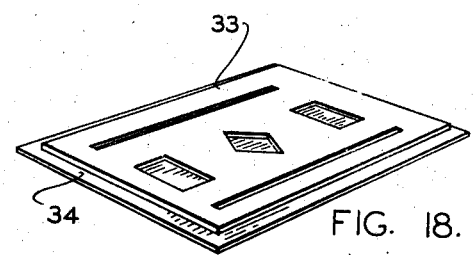

Figure 18 illustrates in perspective a stencil sheet having a film sheet secured to a surface thereof.

Figure 19:
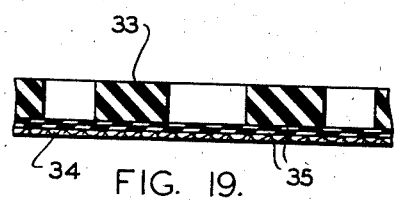

Figure 19 is an enlarged section through a portion of the stencil of Figure 18.

Figure 20:
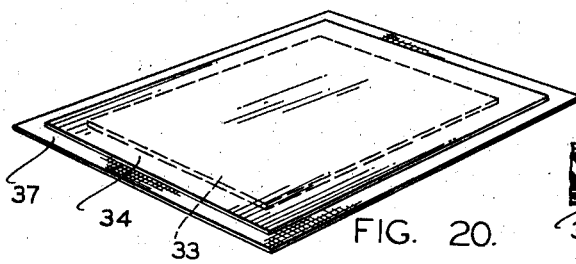

Figure 20 is a perspective view of the stencil of Figures 18 and 19, showing a screen adhered thereto.

Figure 21:
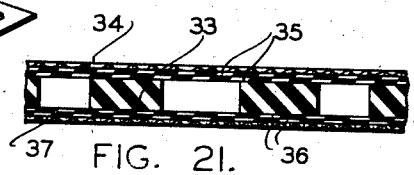

Figure 21 is an enlarged sectional view of the stencil shown in Figure 20.

Figure 22:
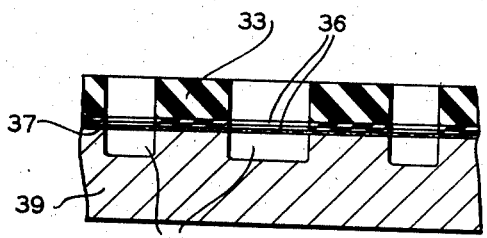

Figure 22 is a sectional view of the stencil of Figure 21 in use.

Figure 23:
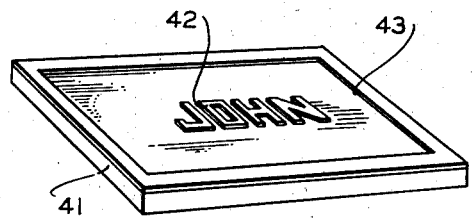

Figure 23 illustrates in perspective a mold used for casting a stencil device.

Figure 24:
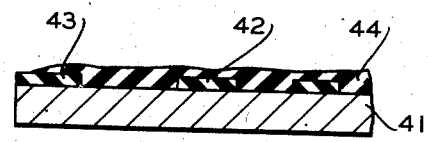

Figure 24 is a sectional view through the mold of Figure 23, showing sand blast resistant material, such as rubber paste, applied thereto.

Figure 25:
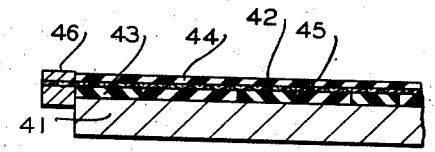

Figure 25 is a view similar to Figure 24 showing a screen embedded in the rubber paste, and extending flush with the mold surfaces. To hold the screen taut, a frame is illustrated.

Figure 26:

Figure 26 illustrates the stencil, screen and screen frame removed from the mold.

Figure 27:
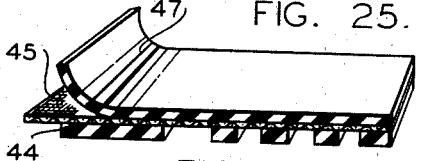

Figure 27 is a sectional detail, showing the manner in which the rubber or other material is stripped from one surface of the screen.

Figure 28:
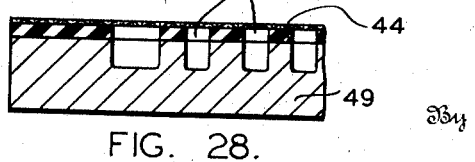

Figure 28 shows the stencil of Figure 27 in use upon work being sandblasted.

Figure 1:
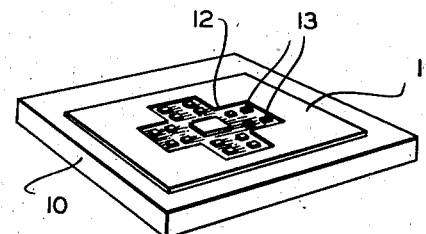
Figure 1 is a perspective view of a pattern after the same has been cut.
Figure 2:
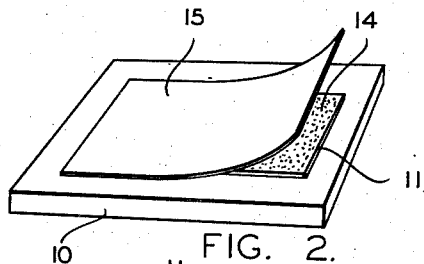
Figure 2 illustrates diagrammatically a sheet of linen, paper, or the like, being applied to the surface of the design.

In order to accomplish my method I first place upon a table or any suitable support, such as 10, a sheet of rubber or other suitable composition designed to stand up under a sandblasting process. This sheet of material 11 may be adhered to the surface of the table or support 10 during the cutting of the stencil. Figure 1 shows a figure cut from the stencil and including a relatively large opening 12 having a series of individual stencil elements 13 within this opening which are disconnected with each other and with the remainder of the stencil. It will be understood that under most circumstances this type of stencil would have to be cut directly upon the work which is to be sandblast, or else the stencil would have to be assembled with all of the parts 13 in proper relationship within the opening 12.

In order to accomplish my method I then place over the surface of the stencil sheet 11, a film of adhesive 14 and to the adhesive I adhere a flexible film of linen, paper, or the like, indicated by the numeral 15. The adhesive 14 which is used to adhere the film 15 to the stencil 11, provides a stronger bond than the adhesive holding the stencil sheet 11 to the support 10, so that the elements of the stencil will adhere to the film 15 and will be removed therewith. In Figure 3 of the drawings I disclose the stencil being removed from the support 10. It will be noted that the backing sheet 15 supports the elements 13 of the stencil 11 in proper relationship and all of the elements of the stencil remain in the same relative position as in the Figure 1, while these elements were being cut.

The foregoing method of preparing the stencil on the backing sheet 15 may vary under certain conditions. If it is desired, the linen or paper sheet 15 may be adhered to the rubber before the stencil is cut and the stencil prepared by cutting through the rubber but not through the paper or linen. However the stencil is prepared, whether it be machine-cut or manually cut, is somewhat immaterial as long as all of the parts 13 of the stencil which are disconnected from the remaining parts of the stencil, are assembled in proper relationship and adhered to a sheet such as 15.

After the stencil has been prepared, the surface thereof opposite the flexible sheet 15 is coated with an adhesive 18 and the stencil is secured to the surface coated with adhesive 18 to be sandblasted. When secured in this way the linen sheet 15 is outermost and the opposed surface of the stencil is secured to the coated surface of material 16 upon which the design is to be sandblasted. Sand is then forced through the sandblasting nozzle 17 and the sand cuts through the easily fracturable film 15, passing through the stencil and striking the surface of the body 16 being sandblasted. The design is then cut into the surface of the body 16 not covered by the stencil 11. The force of the sand blast removes the greater part, if not all, of the linen film as such material is not capable of standing up under the strain of the sand blast while the rubber or other material forming the sheet 11 is designed to withstand this action.

After the sandblasting operation takes place the next step in the process is to remove all of the parts of the stencil from the sandblasted surface in their proper spaced relationship. This I accomplish by the use of a new sheet 15 of linen, paper, or other suitable material coated with adhesive as illustrated at 19. The sheet 15 is coated with adhesive as is also the exposed surface of the stencil 11 if it is so desired, and the sheet 15 is pressed firmly in place over the surface of the stencil. The adhesive 19 is preferably a stronger bond with the material forming the stencil than is the adhesive holding the parts of the stencil to the surface of the body 16. The entire stencil may be removed as indicated in Figure 6 of the drawings, the backing sheet 15 forming a support for the remaining portion of the stencil sheet 11 and including the separate parts 13 of the stencil which do not contact any other portion of the stencil. This same procedure may be followed any desired number of times within the limits of strength of the stencil. It will be noted that each time the stencil is applied, the various elements forming the complete stencil are placed in definite relationship on the surface to be sandblasted; and each time these parts are removed, they remain in the exact relationship in which they are applied. For this reason I have found that by my method, the same stencil having many disconnected parts may be used over and over again without in any way affecting the stencil except to wear the same slightly as is usual under constant sandblasting.

My method is also applicable for use in conjunction with zinc etchings, electrotypes or other relief molds. In Figure 9 of the drawings, I disclose a zinc etching 20 mounted upon a wooden block 21 and show placed over the surface of the etching a rubber paste solution 22. This paste solution fills the low portions of the zinc etching and as illustrated in the cross-sectional view in Figure 11, also covers the high places of the etching with a thin film. The low places of the etching are indicated in the figure at 23, while the surface portions of the etching are shown at 24. This method is ordinarily followed as it is difficult to merely fill the low portions 23 of the mold or etching up to the level of the raised surfaces or printing surfaces 24 of the same.

After the rubber paste has partially set, a strip of water-moistened linen or the like may be placed over the surface of the rubber and the rubber rolled out smooth with a suitable rolling device. The linen is then removed. This step is employed merely to flatten the upper surface of the rubber and need not be employed if some other means is used to maintain the upper surface of the rubber normally relatively flat. After the solution has properly set one of two methods of procedure may be followed. The first and most simple of these procedures is to rub down the surface 25 of the rubber casting with a cloth-covered block, using rubber solvent as a medium. The rubber solvent gradually wears away the upper surface of the rubber until this surface is flush with the printing surface of the etching or mold. In other words, the low portions 23 of the zinc etching are filled with rubber up to the printing surfaces, but no rubber projects above the printing surfaces 24 of the mold.

When the rubber casting has been rubbed down to the printing surface, as indicated in Figure 12 of the drawings, the surface of the rubber casting is coated with an adhesive or cement 26 and a backing sheet 27 is applied thereto. In this case, as in other instances in my method, it is usually most practical to coat the surface to be covered as well as the flexible sheet, with the adhesive, let these adhesive coated surfaces set, and then apply the two coated surfaces together. The stencil may then be removed from the etching 20 in the manner illustrated in Figure 14 of the drawings, the various separate parts of the stencil being held in place upon the linen or paper backing sheet 27. The stencil may then be secured to a body 29 to be sandblasted by coating the surface 30 of the stencil with adhesive and applying the stencil onto the surface to be sandwiched. During the sandblasting operation, the sand is forced through the nozzle 17 at a high rate of speed, and this action cuts through the linen or paper backing or covering sheet 27. During the sandblasting process the sheet 27 is destroyed, but the parts are secured in definite relation on the body 29 to be sandblasted, and thus they remain in fixed relationship.

At the completion of the sandblasting operation, a new backing sheet 27 of linen or paper or the like is applied over the exposed surface of the stencil being secured thereto by adhesive 31, This adhesive 31 is a stronger adhesive then that holding the stencil to the body 29 so that the stencil may be removed as indicated in Figure 17 of the drawings, the design sandblasted then showing up clearly upon the body 29.

The second procedure which may be followed after the rubber paste solution has been formed on the zinc etching or electrotype 20 is somewhat similar to the method just described. In this form of my invention, the rubber mass is permitted to set while in the position illustrated in Figure 9. This rubber is then removed, inverted and placed upon a wax surface or the like. The design which has been formed in the rubber by the zinc etching or electrotype is then uppermost. A plaster casing is then cast over the rubber mold and permitted to harden. When complete, this plaster casing will have the same conformation as the etching or electrotype from which the rubber mold was made.

The surface of the rubber is then rubbed away by means of a cloth-covered block moistened with a rubber solvent. This block and cloth acts as a buffer to rub away the surface of the rubber down to the surface of the plaster casting. I then find a construction virtually identical to that illustrated in Figure 12, the lower portion being in this case a plaster casting bearing portion of rubber which may or may not be connected. The upper surface of the casting and rubber is then coated with adhesive and a linen or paper backing sheet is applied to this surface. The backing sheet is rolled into intimate contact with all of the rubber particles in the mold. The stencil thus formed may be removed from the plaster cast, or if necessary the plaster cast may be broken and cracked away, leaving the rubber particles adhered to the surface of the backing sheet. The stencil may be then used by coating the surface 30 thereof in the manner which has been previously explained.

It will be found in some instances that the depth of the recesses in some of the zinc etchings or electrotypes is so uneven that it is difficult to place the stencil on a flat surface by placing adhesive on the surface 30 of the mold. In instances where it is desired to duplicate an electrotype or zinc etching of this type, it is often preferable to coat the linen or paper covering 27 with adhesive and secure this surface of the stencil to the body 29 to be sandblasted. Thus a clear, sharp impression is assured. With this arrangement, it is difficult to assemble the various elements of the stencil in their proper relationship with another backing sheet such as 27 after the sandblasting operation has taken place, but a new stencil may readily be formed from the electrotype or zinc etching. This procedure has the advantage that intricate designs may be drawn on a large scale and reduced on the zinc etching, and in such work it is usually worth while to form a new stencil for each sandblasting operation. It will be understood, however, that this method utilizes my method of assembling all of the disconnected parts of the stencil onto a backing sheet so that the parts may be assembled in proper relationship upon the surface to be sandblasted.

In Figure 18 of the drawings, I disclose a stencil 33 which is adhered to a flexible sheet 34, by the adhesive 35. This stencil is either cut while mounted upon a working surface and has the flexible sheet 34 adhered thereto, or if it is desired, the stencil sheet 33 may be cut while the flexible sheet 34 is adhered thereto. A coating of adhesive 36 is then applied to the opposite surface of the stencil sheet 33 from that bearing the flexible sheet 34, and a screen sheet 37 is likewise coated with adhesive. The screen is applied to the adhesive coated surface of the stencil sheet 33 and this screen is thus affixed to the stencil. In this way a rigid stencil is formed which may be merely clamped against the work during the sandblasting process. During the sandblasting process the screen 37 may be on the underside of the stencil sheet 33, adjacent the work surface 39, or may be on the surface of the stencil sheet 33 which is spaced from the work surface. During the sandblasting operation the sand is blown through the screen 37, this screen permitting sufficient of the sand to be forced therethrough to cause proper carving of the work surface. If the screen 37 is positioned adjacent the work surface 39 in the manner illustrated in Figure 22 of the drawings, this screen may somewhat deflect the path of the sand, providing an appearance along the edges of the apertures 40 formed in the work surface 39 by the sand which simulates a hand tooled job. If the screen 37 is on the outer surface of the stencil sheet 33, the path of the sand is not as closely defined by the screen, and a smoother carving operation is permitted.

After the work has been carved by the sandblasting process, it may be found that the screen 37 is intact or portions of the screen may have become injured during the carving process. If the screen is in good shape at the end of the carving operation, the stencil may be moved to another work surface and another similar design carved. If, however, the screen has been injured by the blast of sand during the sandblasting operation, a new sheet of flexible material such as linen, paper or the like may be adhered to the surface of the stencil sheet 33 opposite that bearing the screen 37, and the stencil sheet may be removed from the screen and a new screen may be applied thereto. In other words in this type of construction the stencil may be moved from one screen to another in the same manner that was previously described for moving the stencil from one work surface to another.

In Figure 23 of the drawings I disclose another form of construction which discloses a different method of forming stencils. In this method, a mold is first prepared as illustrated in Figure 23. This mold 41 may bear indicia such as 42 and may be provided with an edge rim 43. The mold 41 may be in the form of an electrotype, zinc etching, or the like, or may be a stencil cut in any suitable firm material. It is desirable, however, that the mold be formed with the indicia and rim extending to a common plane as is usual in the case of zinc etchings, electrotypes, and the like.

The mold 41 is then covered with a coating of rubber paste 44 or the like which fills the interstices between the various parts of the indicia 42 and between the indicia 42 and the rim 43. This rubber paste 44 is preferably applied in liquid or molten state so as to form a plastic mass covering the mold 41. While the rubber paste 44 or the like is still in a plastic state or in molten form, a screen 45 is forced down upon the mold so that the screen lies flush upon the rim 43 and the indicia 42. It is extremely desirable that the screen 45 contact the surface of the indicia or design 42. As illustrated in Figure 25 of the drawings and in order to maintain the screen taut during this insertion, the screen may be clamped or otherwise secured within a screen frame 46.

When the screen has been forced down into the plastic mass 44, it would appear in section in the manner illustrated in Figure 25 of the drawings.

When the rubber paste or other material 44 has had an opportunity to set or to assume desired shape, the frame 46 with its screen 45 may be lifted from the mold 41, this screen and stencil sheet appearing as indicated in the perspective view of Figure 26 of the drawings. When the plastic or flexible stencil sheet has dried or set sufficiently, the portion of the rubber paste or other material which has been forced through the screen as the screen is pressed down over the stencil may be peeled off from the screen in the manner illustrated in Figure 27 of the drawings. It will be found that the plastic stencil sheet having the screen 45 embedded therein will peel off from the screen under pressure so that the screen is adhered to one surface of the remainder of the stencil rather than embedded within the stencil as in Figures 25 and 26. The portion of rubber paste or the like 47 which is peeled away from the screen is discarded or remelted or dissolved, the remaining stencil having openings therethrough up to the screen and the screen permitting the sand to pass therethrough during the sandblasting operation, or remove screen.

In Figure 28 of the drawings I disclose a work surface 49 having a stencil sheet 44 adhered thereto or clamped against the surface thereof, this stencil sheet 44 having openings 50 therein so that during the sandblasting operation the sand will be blown through the screen and through the openings in the stencil sheet 44 to carve the work surface 49.

In adhering two laminations of stencil material together or in securing a flexible sheet or screen to a sandblast resistant material, it is common practice to coat both the contacting surfaces with a cement which will cause the uniting of the two surfaces when placed in contact. Thus where adhesive is used in any of the positions described, this adhesive is commonly of a type similar to rubber cement in the use of which both contacting surfaces are coated. In case other adhesives are used, however, it may be necessary to coat only one of the contacting surfaces.

I have found my method extremely satisfactory and have found that a great number of patterns may be sandblasted from the same stencil in a short period of time even though the parts of the stencil are relatively disconnected. I have also found that I have been able to sandblast replicas of intricate designs formed on a large scale and reduced by molding rubber or the like over these zinc etchings or electrotypes. I have found it possible to form minute lettering by this process and to sandblast designs which would be almost impossible to cut manually.

In a color printing process, it is customary to use a series of different color cuts, each of which prints a design in one color, which designs may be superimposed one upon the other to produce a final result. In a similar manner it is possible for me to provide a series of stencils each of which is of a different shape or bears an individual design, but all of which register to produce a single finished design.

In accordance with the patent statutes, I have described the principles of operation of my method; and while I have endeavored to set forth the best embodiments thereof, I desire to have it understood that these are only illustrative of ways of carrying out my invention and that obvious changes may be made within the scope of the following claims without departing from the spirit of my invention.

I claim:

1. The method of forming duplicate designs through the use of a sandblast resistant stencil, and a series of flexible fracturable sheets, the method consisting in cutting the stencil, mounting the same in desired relationship on a fracturable sheet, adhering the stencil to the surface upon which the design is to be sandblasted, sandblasting the design on the surface, the force of the sand fracturing the said sheet, applying a new fracturable sheet to the stencil in place of the one destroyed by the sandblasting process, and removing the stencil from the sandblasted surface for use on another surface to be sandblasted.

2. The method of preparing sandblasted designs with a stencil formed of material resistant to the sandblasting process and mounted upon a sheet which may be destroyed by the sandblasting process, the method consisting in applying the stencil to the surface, sandblasting through the stencil to produce the design and to destroy the sheet upon which the stencil was mounted, applying a new mounting sheet similar to that destroyed to the stencil, and removing the stencil from the sandblasted surface with said sheet.

3. A method of sandblasting designs with the use of a blast resistant stencil and a film non-resistant to a sand blast, the method consisting in applying the stencil to the work to be sandblasted, sandblasting the surface exposed through the stencil, adhering the non-resistant film to the stencil, removing the stencil from the work sandblasted together with the film, applying the stencil and film to another surface to be sandblasted, and sandblasting the film, and stencil, the non-resistant film being destroyed by the blast to expose the stencil and permitting the blast to strike the work surface through the stencil.

4. A method of sandblasting designs with the use of a blast resistant stencil having openings therethrough and a non-resistant film, the method consisting in applying the stencil to the work surface to be sandblasted, adhering the non-resistant film to said stencil, the film overlying the openings in the stencil, removing the stencil from the work surface together with the film, applying the stencil and film to a second work surface to be sandblasted, and sandblasting the film and stencil, the blast destroying the portion of the film overlying the openings and striking the second work surface exposed thereby through said stencil.

5. A method of sandblasting designs with the use of a blast resistant stencil and a non-blast resistant film, the stencil comprising a series of disconnected parts, the method consisting in applying the stencil to a work surface to be sandblasted, directing a sandblast against the portion of the work surface exposed by the stencil, adhering the non-blast resistant film to the stencil, the film adhering to all of the disconnected parts of the stencil to connect the same, and removing the film with the stencil adhered thereto from the work surface.

6. A method of sandblasting duplicate designs with a stencil comprising a plurality of disconnected parts and a non-blast resistant film, the method consisting in applying the stencil to a work surface to be sandblasted, sandblasting the work surface through the stencil, adhering the non-blast resistant film to the disconnected parts of the stencil, removing the film with the stencil adhered thereto from the work surface, applying the stencil and film to a second work surface, and sandblasting the second work surface through the stencil, the exposed film being destroyed by the sandblast.

7. A method of sandblasting similar designs on a plurality of work surfaces with the use of a stencil and a nonblast resistant film, the method consisting in adhering the stencil to a work surface with an adhesive means, sandblasting the work surface through the stencil, adhering the film to the stencil with an adhesive stronger than that adhering the stencil to the work surface, removing the film and stencil from the work surface, adhering the stencil to a second work surface, and sandblasting the stencil and film, the exposed film being destroyed to expose the second work surface not covered by the stencil, and sandblasting the second work surface.

HAROLD R. HELGESON.